INVENTORS
THOMAS L. ANGELUCCI
FREDERICK W. KULICKE, JR.
BY
Bilher & Moyerman
ATTORNEYS INVENTORS
THOMAS L. ANGELUCCI
FREDERICK W. KULICKE, JR.
BY
Bilher & Moyerman
ATTORNEYS May 10, 1966 T. L. ANGELUCCI ET AL 3,250,452

NAIL HEAD BONDING APPARATUS FOR THERMOCOMPRESSIVELY SECURING LEAD WIRE TO SEMI-CONDUCTOR DEVICES

Filed Jan. 29, 1963 9 Sheets-Sheet 3

INVENTORS
THOMAS L. ANGELUCCI
FREDERICK W. KULICKE, JR.
BY
Belker & Mogeman [signature]
ATTORNEYS INVENTORS
THOMAS L. ANGELUCCI
FREDERICK W. KULICKE, JR.
BY
Bilher & Mozerman
ATTORNEYS INVENTORS
THOMAS L. ANGELUCCI
FREDERICK W. KULICKE, JR.
BY
Belher & Mayeman
ATTORNEYS INVENTORS
THOMAS L. ANGELUCCI
FREDERICK W. KULICKE, JR.
BY Bilber & Morgensen
ATTORNEYS INVENTORS
THOMAS L. ANGELUCCI
FREDERICK W. KULICKE, JR.
BY
Bilher & Mayerman
ATTORNEYS FIG. 16
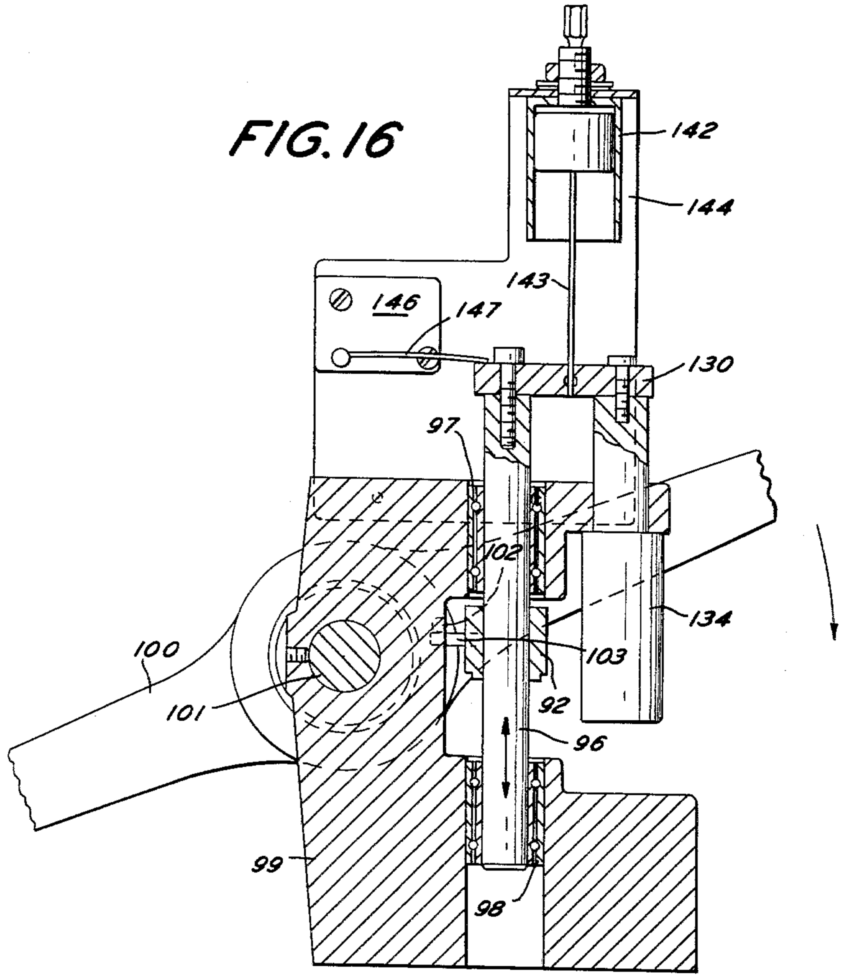
FIG. 17 FIG. 18 FIG. 19
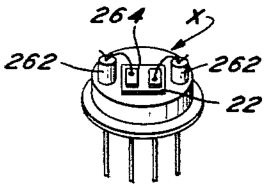
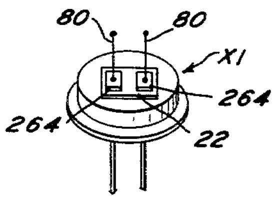
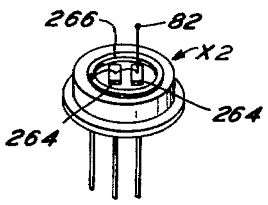
INVENTORS
THOMAS L. ANGELUCCI
FREDERICK W. KULICKE, JR.
BY
Belker & Mogerman
ATTORNEYS INVENTORS
THOMAS L. ANGELUCCI
FREDERICK W. KULICKE, JR.
BY
Bilker & Maglione
ATTORNEYS 3,250,452
Patented May 10, 1966

3,250,452

NAIL HEAD BONDING APPARATUS FOR THERMOCOMPRESSIVELY SECURING LEAD WIRE TO SEMI-CONDUCTOR DEVICES

Thomas L. Angelucci and Frederick W. Kulicke, Jr., Philadelphia, Pa., assignors to Kulicke and Soffa Manufacturing Company, Fort Washington, Pa., a corporation of Pennsylvania Filed Jan. 29, 1963, Ser. No. 254,721
23 Claims. (Cl. 228—3)

This invention relates to a thermocompression bonding apparatus for securing fine lead wires to semi-conductor devices, and more particularly relates to a "nail head" or "ball head" bonding apparatus for thermocompressively attaching the leads to certain components on semi-conductor wafers in order to complete the solid state circuitry.

"Nail" or "ball" head bonding, as is well known in the semiconductor fabrication art, is the thermocompressive bonding operation performed by smashing a ball at the end of a lead wire against a conductive deposition, such as gold, generally configured in the form of stripes or dots on the surface of a semi-conductor wafer. In this particular type of bonding, the lead wire is dispersed from a rotatably supported spool through a vertically reciprocable tool, called a capillary, having a bore of a diameter slightly greater than the wire itself. The passing of a hot flame across the wire below the capillary tip, causes the formation of a ball or enlarged bead (greater than capillary diameter) at the ends of the severed wire as a result of surface tension in the molten metal. After the capillary is manipulated to a position directly over the point of the semi-conductor device at which the wire is to be bonded, it is released and allowed to fall in a guided vertical path. The capillary tip engages the ball depending from the wire extending through the bore, unspools a predetermined length of the wire, and presses the ball against the heated semi-conductor wafer. The thermocompressive deformation of the ball produces a bond having a characteristic inverted nail head shape at the end of the lead. In order to reduce the stress at the juncture of the lead wire and the nail head bond, the distal end of the capillary bore is generally chamfered or flared so that a complementary fillet will be generated on the upper suprface of the ball during the deformation thereof. After the bonded juncture is made to the semi-conductor surface, the capillary is then moved substantially horizontally carrying a length of wire along with it to a terminal post on a metal casing which is referred to as a "header." Once again, the capillary is released, and since no ball has been formed in the trailing lead wire, only an edge of the capillary tip engages this tail to form a "wedge" bond to the post. Thereafter, the capillary is elevated, the flame is permitted to pass and sever the upstanding wire and thereby form a ball on the upstanding pig-tail and one at the end depending from the capillary preparatory to the next sequence of operations.

Nail head wire bonding equipment heretofore used has been generally deficient in its ability to accommodate the extremely fine gauge wire required in present day solid state circuitry. That is, it has become necessary to resort to lead wire having a diameter of less than one mil because of the diminution of semi-conductor geometry demanded for the higher frequency ranges of today's electronic apparatus. However, the problems attendant to handling such extremely fine gauge wire by a ball bonding system multiply proportionately with each decrement of a tenth of a mil below one thousandths of an inch. Not only is there difficulty in threading continuous lengths of this wire through the capillary because of its kinking tendencies, but also such wire has a disposition to curl and spring back to a helical configuration as a result of its inherent memory characteristics from having once been wound upon a spool.

In addition, the decreasing size of the cross-section of these wire filaments makes them quite subject to breakage or failure even with the imposition of the slightest excess of strain thereupon. Accordingly great sensitivity is demanded in manipulating the wire to the exact position on the semi-conductor wafer, and extreme delicacy in bonding loads must be exerted in order to avoid stressing the wire beyond the elastic limit. Furthermore, it is desirable and necessary that the bonding pressures imposed by successive thermocompression bonding operations be uniform in order to yield bonds of consistency and strength which will not fail in service under usual conditions of vibration or fatigue. Thus, the application of the bonding load should be subjec to a minimum of friction and directed in a pure uni-directional manner so that "scrubbing" of the wire against the solid state device will be eliminated.

Moreover, it is most important that the bonding instrument perform the operations with speed in order to provide economy of production of the semi-conductor assemblies. Thus, there is a need for a simplification as well as automation of controls whereby requirements of operator judgment and skill can be reduced as much as possible. In this regard, it is desirable that the dispensation of the wire, the length of wire to be fed, the severing of the wire, the formation of the balls, the bonding pressure, and the duration of the bonding impulse all be performed automatically as a standard function of the bonding apparatus.

It is therefore an object of this invention to provide a thermocompression lead bonding apparatus which will fulfill all of the foregoing requirements.

Another object of this invention is to provide a nail head wire bonding apparatus which will automatically dispense a measured length of fine wire from a spool, form a uniform size ball at the end of the wire, bond the wire to the exact point at which the operator has manipulatively positioned the bonding tool, and sever the wire all in a programmed sequence.

Another object of this invention is to provide a nail head wire bonding apparatus which can successfully accommodate wire diameters from a few tenths of a mil to many mils.

Another object of this invention is to provide a nail head bonder which will handle the most delicate fine wire efficiently without causing failure or breakage thereof during manipulation or bonding operations.

Still another object of this invention is to provide a nail head bonding device which will automatically tension the wire and eliminate its tendency to spring back into the curled condition resulting from spooling memory.

Yet another object of this invention is to provide a nail head bonder which can be programmed to perform "stitch" bonding as well as ball bonding operations with semi-automatic control permitting recycling of any part of either operation.

A still further object of this invention is to provide a non-scrubbing gravity free-fall bonding device whereby friction is at a minimum with consequent consistency and uniformity in the bonds produced.

Another object of this invention is to provide a nail head bonding device which will permit use of either a carbide or glass capillary.

Another object of this invention is to provide a nail head bonding apparatus having semi-automatic capillary loading and gas-pressurized wire feeding so as to eliminate threading of the soft and delicate fine wire through the needle.

Another object of this invention is to provide a nail head bonding apparatus which will bond to stripes and posts of semi-conductor devices without rotating or repositioning of the semi-conductor header in the heat column.

Another object of this invention is to provide a nail head bonding apparatus which will enable each semi-conductor device to be sequentially and automatically rotated into position preparatory to having the wire bonding operations performed thereon.

Other objects of this invention are to provide an improved device of the character described which is easily and economically produced, which is sturdy in construction, and which is highly effective and efficient in operation.

With the above and related object in view, this invention consists of the details of construction and combination of parts as will be more fully understood from the following detailed description when read in conjunction with the following drawings, in which:

FIGURE 16 is a sectional view taken along lines 16—16 of FIGURE 15.

FIGURE 17 is a perspective view of a semi-conductor device having fine wire leads ball-bonded to the stripes and wedge-bonded to terminal posts in a manner provided by one programming sequence of this invention.

FIGURE 18 is a perspective view of a semi-conductor device having a pair of pigtail leads ball-bonded at the lower ends to respective stripes on the wafer and the upstanding ends of the pigtails terminating in balls in demonstration of another programming sequence afforded by this invention.

FIGURE 19 is a perspective view of another semi-conductor device showing a "stitch" bonding operation of still a third programming sequence afforded by this invention.

Figure 1:
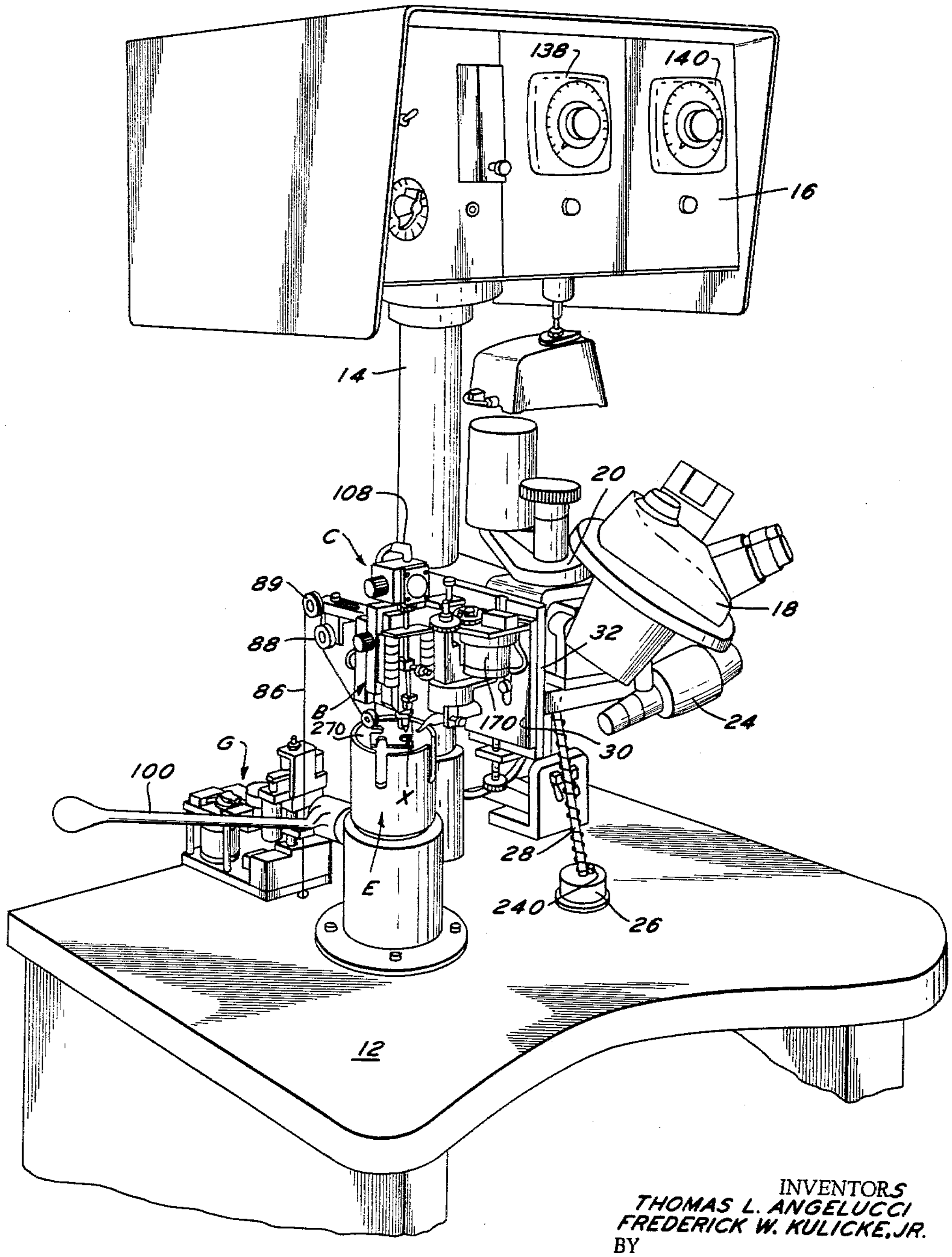
FIGURE 1 is a perspective view of a semi-conductor wire bonding apparatus embodying this invention.

Referring now in greater detail to the drawings in which similar reference characters refer to similar parts, we show an apparatus for the nail head bonding of fine lead wire to semi-conductor devices comprising a frame, generally designated as A, a wire bonding head, generally designated as B, a wire dispensing head, generally designated as C, a flame-off assembly D for severing the wire and forming a ball on the ends thereof, a heating platform E for holding the semi-conductor devices, a manipulator F for positioning the bonding head over the area of the semi-conductor device to which the lead wire is to be secured, and programming means G for automatically cycling the apparatus through the bonding and cut-off operations in a predetermined sequence.

The frame A includes a base or table top 12 having a column 14 extending therefrom for supporting a console module 16 which contains electrical and gas control components. The manipulator or F upon which the bonding head B and the flame-off assembly D are mounted is adjustably affixed to the column 14 by suitable brackets (not shown). A stereo microscope 18 is hingedly supported upon a pod 20 which is clamped at the upper portion of the manipulator housing so that the operator may conveniently swing the bonding head B to a position over the semi-conductor wafer 22 and observe the wire bonding operation under three-dimensional magnification. A suitable illuminator 24 directs a beam of light upon the surface of the transistor header which is seated in the heat platform E.

Figure 3:
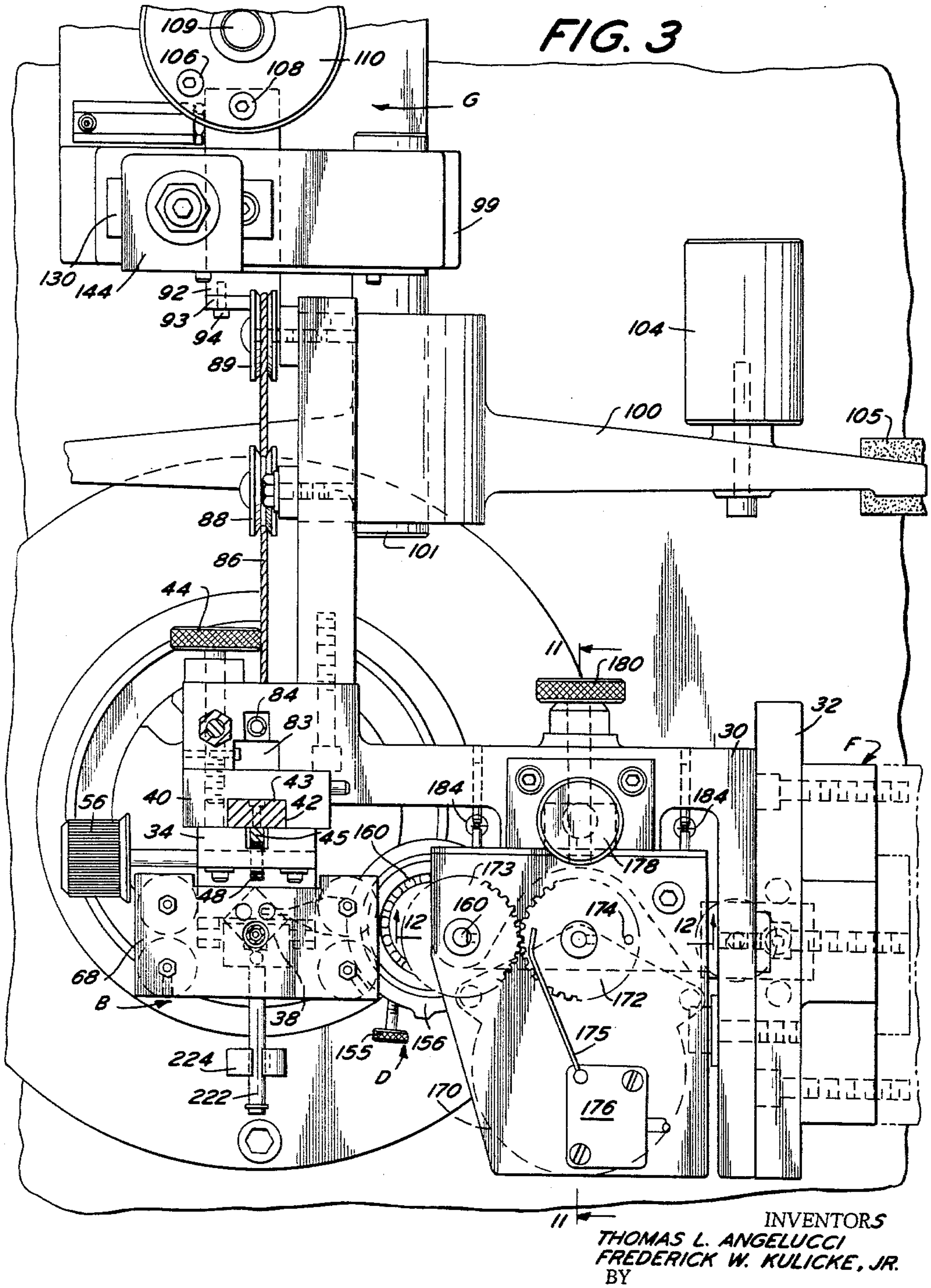
FIGURE 3 is a sectional view take along lines 3—3 of FIGURE 2.

The manipulator F comprises a micropositioning assembly substantially identical to that fully shown and described in U.S. Patent No. 3,149,510 for an invention by Frederick W. Kulicke, Jr., in "Fine Wire Manipulator and Bonding Instrument for Transistors." Sliders (not shown) in the manipulator housing 25 are coupled to a fingerpiece 26 by a downwardly depending rod 28 which is retained in universal bearings in both the sliders and the fingerpiece. Horizontal positioning or movement of the fingerpiece 26, called a "chessman," upon the surface of the table top 12 transmits a proportionaly reduced movement in the corresponding horizontal X- and Y-axes through the sliders to a mounting bracket 30 which supports the bonding head B. The head support bracket 30 is substantialy L-shaped in plan configuration and is secured to the face of a vertically disposed plate 32 of the manipulator F, as shown in FIGURE 3. Thus, the operator can by manipulation of the chessman 26 position the bonding head B to an exact point above the semi-conductor header in the platform E preparatory to performing the wire bonding operations.

Figure 4:
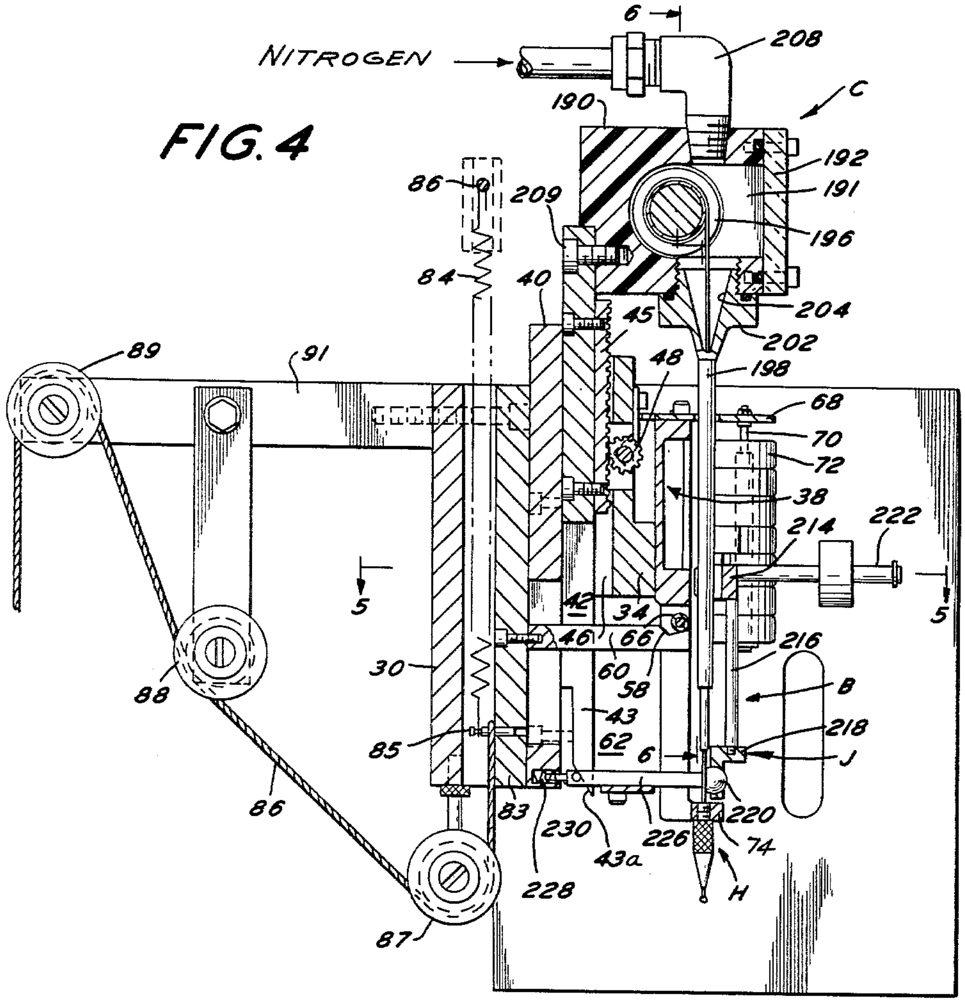
FIGURE 4 is a sectional view taken along lines 4—4 of FIGURE 2.
Figure 5:
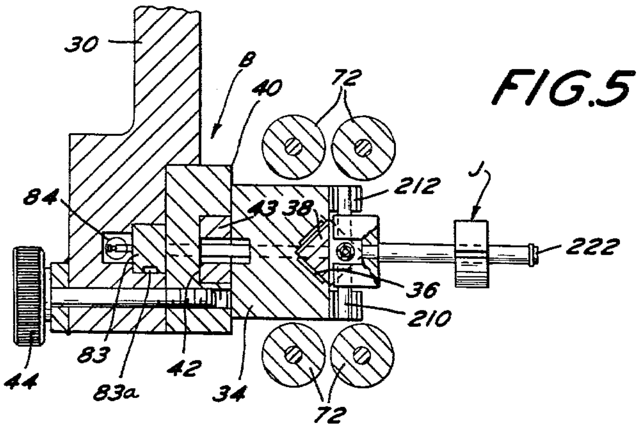
FIGURE 5 is a sectional view taken along lines 5—5 of FIGURE 4.
Figures 6, 7, 8, 9, 10:
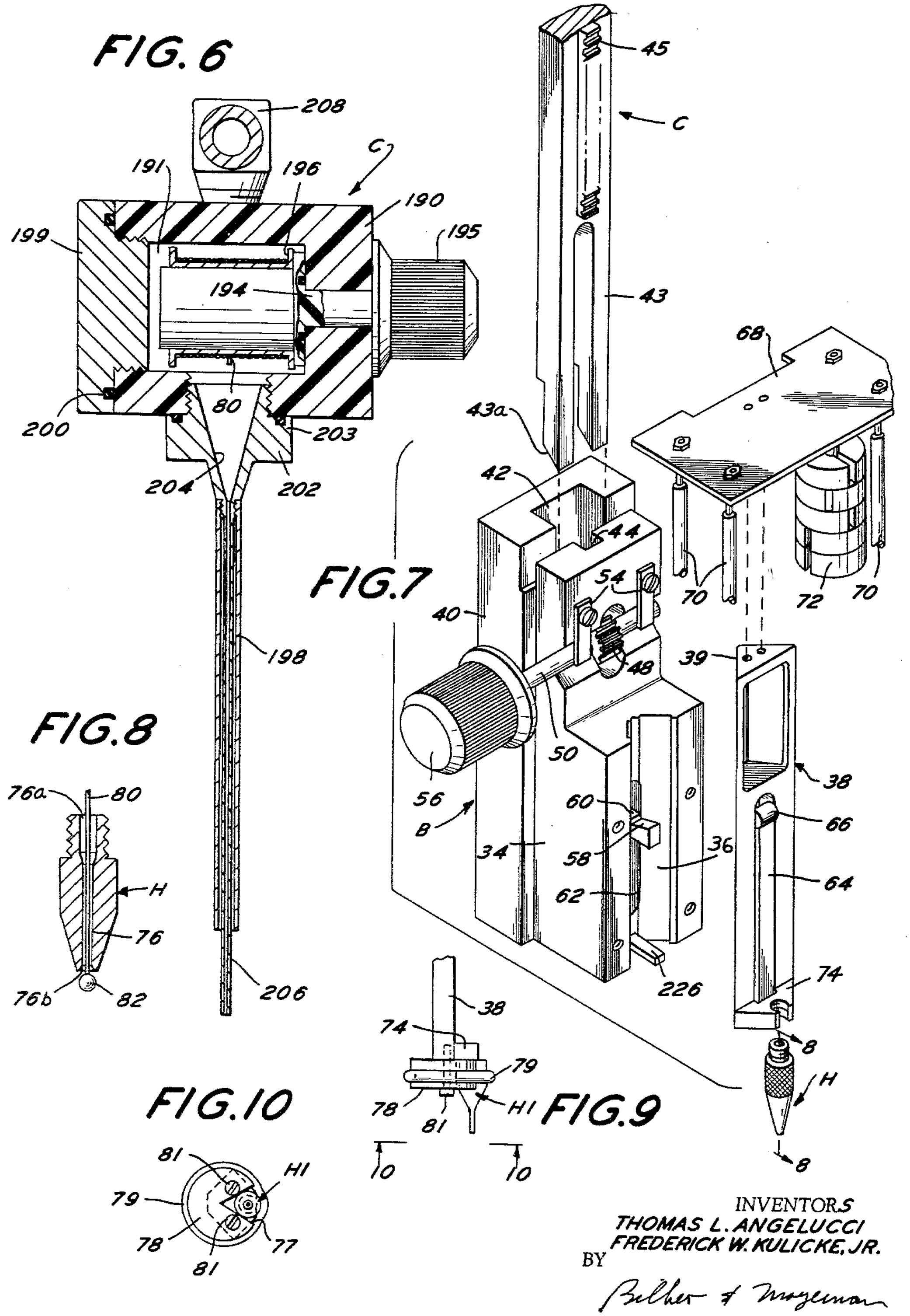
FIGURE 6 is a sectional view taken along lines 6—6 of FIGURE 4.
FIGURE 7 is an exploded perspective view of the wire bonding head assembly embodied in this invention and showing a carbide capillary.
FIGURE 8 is an enlarged sectional view taken along lines 8—8 of FIGURE 7.
FIGURE 9 is a side elevational view of a modification of the capillary holder shown in FIGURE 7 and showing a glass capillary.
FIGURE 10 is a sectional view taken along lines 10—10 of FIGURE 9.
Figures 11, 12, 13:
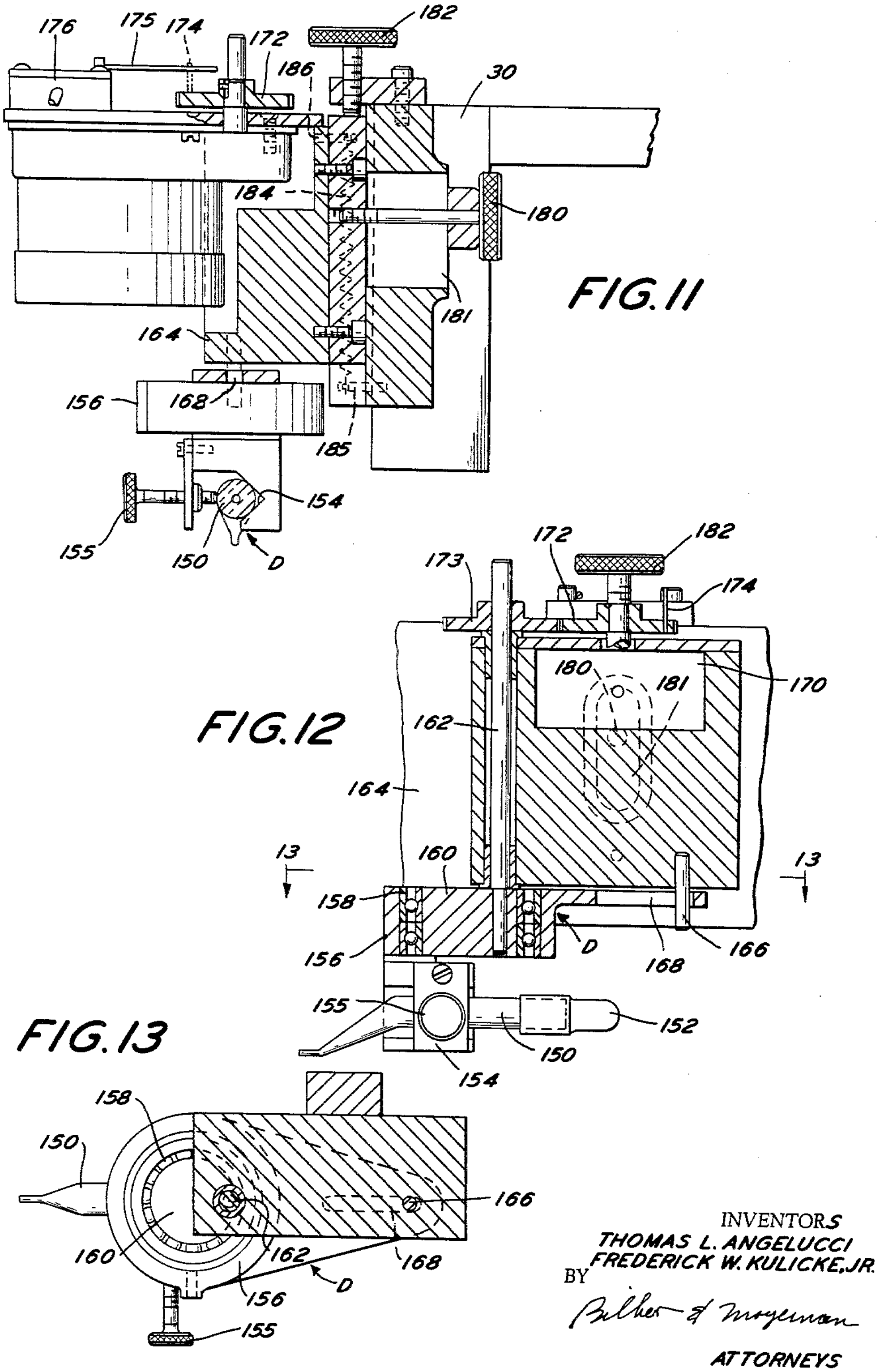
FIGURE 11 is a sectional view taken along lines 11—11 of FIGURE 3.
FIGURE 12 is a sectional view taken along lines 12—12 of FIGURE 3.
FIGURE 13 is a sectional view taken along lines 13—13 of FIGURE 12.

Referring to FIGURES 2, 3, 4, 5, and particularly FIGURE 7, the bonding head B comprises a guideway member 34 having a V-shaped recess or track 36 disposed in its front surface and a vertically reciprocable slider element 38 having a complementary V-shaped projection 39 which is adapted to slidably abut against the track. Secured to the back surface of the guideway member 34 is a support block 40 which has a rectangular slot 42 vertically extending therein for receiving the bifurcated tail of the 43 of the wire dispenser C. The rear face of the guideway 34 has a vertically extending relief slot 46 which communicates with slot 42 in order to accommodate rack 45 affixed to the dispenser tail 43. The rack 45 is engaged by a pinion 48 secured to the shaft 50. The shaft 50 is journaled in V-notches 52 and retained therein by flat spring clamps 54. The entire bonding head B is detachably mounted to the support bracket 30 by thumb screws 44 which are threaded into tapped holes in the guideway 34. Horizontal positioning of the bonding head B is accomplished by way of the manipulator F. The relative vertical position of the wire dispenser C with respect to the guideway 34 is controlled by knob 56 of the end of shaft 50. Rotation of the knob 56 raises or lowers the wire dispenser C within the bonding head slot 42 as a result of the engagement of pinion 48 with rack 45 and is incorporated for facility during initial wire loading as will be more fully described hereinafter.

One of the most significant features of the instant invention is the provision of a dead weight or gravity free-fall loading system without frictional interference. This provision is embodied in a "no clearance" slide which secures uniform pressure and consistency of loading throughout all and repeated phases of the bonding operation. As has been previously indicated, the back of the slider element 38 has a V-shaped projection which slidably engages the complementary track 36 in the guideway 34. The slider 38 is detachably carried upon an actuating finger 60 which has an inclined notch 58 formed at the outer end therof. The actuating finger 60 extends through an elongated opening 62 in the guideway 34 and is adapted to pass through a longitudinal recess 64 at the lower portion of the slider 38. A small roller 66 is rotatably supported within the top of the recess 64 and freely sits upon the inclined notch 58 when the slider 38 is in poised position on the actuating finger 60 preparatory to bonding. While the slider 38 is carried upon the finger 60, the notch 58 acts essentially as an inclined-plane camming surface which urges the slider 38 rearwardly into face-to-face slidable contact with the vertical guideway track 36. See FIGURES 4 and 7. When the actuating finger 60 is depressed and the slider 38 falls, the slider projection 39 is constantly maintained in contact with the track 36 by constructing the centerline of mass of the slider behind the vertical line defined by the capillary tool H. A plate 68 is secured to the top of the slider 38 and four loading hangers 70 symmetrically depend therefrom for carrying detachable weights 72 so that the bonding force or pressure may be varied, as desired, to suit specific conditions of wire composition and diameter. The lower end of the slider 38 has a triangular stub 74 which projects forwardly of the slider face and in which is mounted the capillary H. Again, it is to be observed that the mass of the slider 38, including the weights 72, is behind the vertical centerline extending through the capillary H so that the slider will be always retained in substantially frictionless horizontal surface contact with the guideway track 36. That is, when the slider 38 is seated upon the actuating finger 60, the roller 66 is urged toward the bottom of the notch 58 thereby directing the slider projection 39 against the track face 36. When the slider is released by depressing the actuating finger 60, the tip of the capillary H rests upon the bonding point and defines at fulcrum forward of the slider mass whereby the slider is still retained against the vertical reference track 36. Thus, the fall of the bonding tool will be in an exact vertical line to produce accurate positioning, and since the horizontal component of the force keeping the slider in contact with the guideway is negligible, the frictional forces therebetween is effectively zero, hence providing uniformity in bonding pressures.

The capillary may either be tungsten, carbide, designated as H in FIGURES 7 and 8 or glass, designated as H1 as shown in FIGURES 9 and 10. The carbide capillary H is threaded into a complementary tapped opening in the stub 74 and is preferably used in connection with larger diameter wire leads 80. As is well known in the art, the capillaries, which are used to both guide the wire 80 and thermocompressively smash a ball 82 formed on the end thereof against the header, are essentially nozzles. These nozzles have a fine bore 76 therein which is of a greater diameter adjacent the proximal upper end **76*a* to facilitate threading of the wire. The lower end of the capillary nozzle has a radius or flare 76*b* about the bore so that a faired fillet will be impressed into the ball 82 during its deformation into the inverted nail head shape. The glass capillary H1 is retained in a V-notch 77 in adapter 78 by a peripheral O-ring 79, the adapter 78 being detachably secured to the sole of stub 74 by screws 81**.

Figures 14, 15:
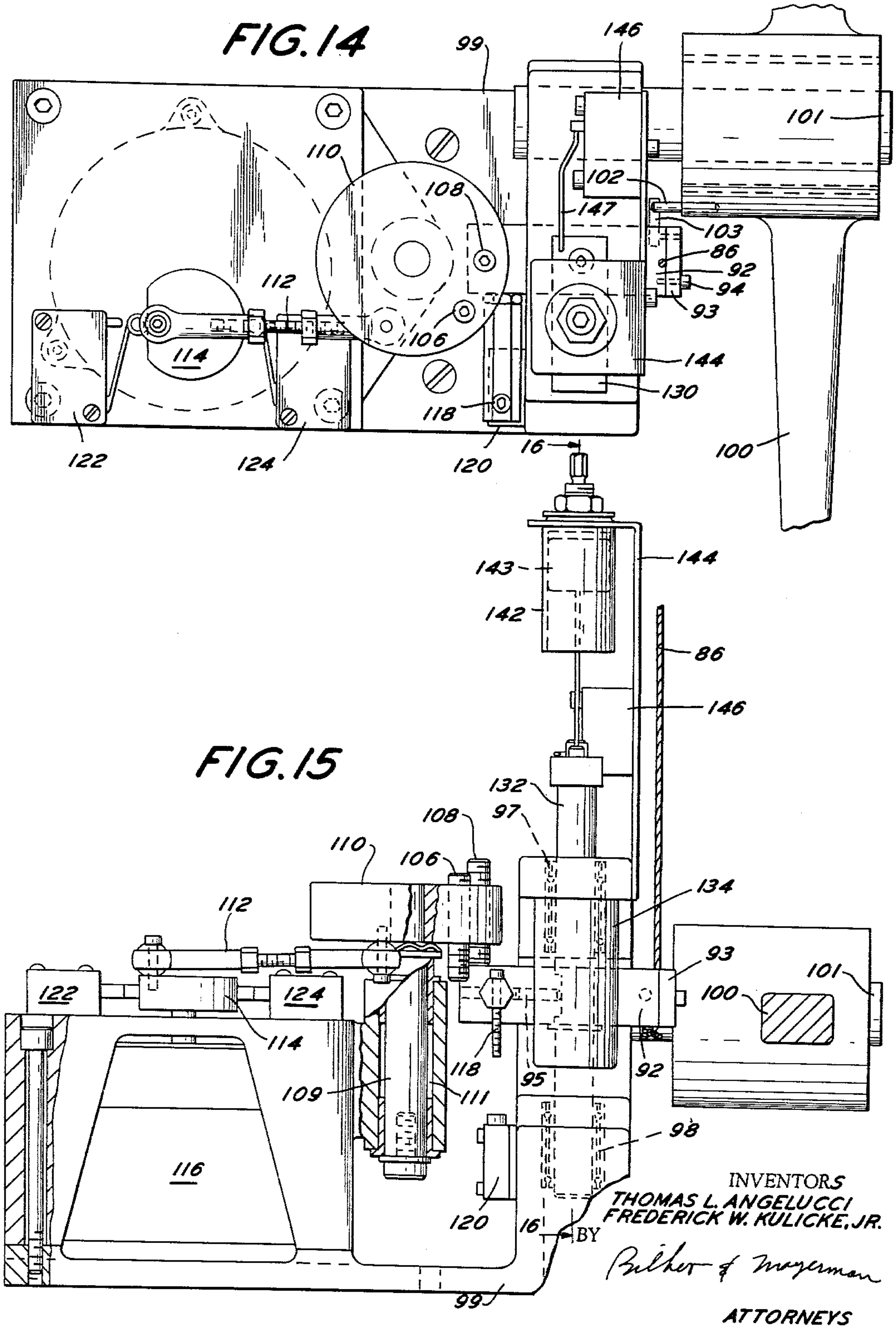
FIGURE 14 is a plan view of a vertical actuating and programming mechanism embodied in this invention.
FIGURE 15 is an elevational view, and partly in section, of the actuating mechanism shown in FIGURE 14.

Referring to FIGURES 4 and 5, the rear end of the actuating finger 60 is secured to a slider bar 83 which is slidably retained in a complementary vertical slot **83*a* in bracket 30. The slider bar 83 is resiliently urged upwardly by a coil spring 84 having its lower end coupled to hanger pin 85 and its upper end to a hanger 85*a* in the bracket 30. Also connected to pin 85 is an actuating cable 86 which is directed around a series of pulleys 87, 88 and 89 all rotatably supported on bracket member 91. The opposite end of the actuating cable 86 is clamped within a slide actuator 92 by a jaw 93 which is held in abutment therewith by a screw 94, as shown in FIGURES 14 and 15. The actuator 92 itself is affixed to a vertically reciprocable plunger 96 by a set screw 95, the plunger being slidable in bearing sleeves 97 and 98 secured within housing member 99**. See FIGURES 15 and 16.

The downward movement of the actuator 92 and its plunger 96 is effected by a lever arm or Z-axis depressor 100 which is hingedly supported in the housing member 99 on shaft 101. A pin 102 protruding from the hub of lever arm 100 engages pin 103 outwardly extending from the actuator plate 92. Depression of the lever arm 100, clockwise rotation, as shown in FIGURE 16, draws the finger 60 in the slider guideway 34 downwardly by way of cable 86 in opposition to the tension of coil spring 84. Suitable counterweights 104 are secured to the right hand portion of the lever arm 100, as shown in FIGURE 3, and act partially in conjunction with the coil spring 84 to throw the Z-axis depressor handle into a non-operative position when hand pressure thereon is released. A resilient pad 105 catches the fall of the right hand end of the Z-arm 100 as a result of the counterweight loading.

It is to be noted that the tension of the coil spring 84 normally drags the actuator plate 92 upwardly against either one of two stepping stops 106 or 108 in the programmer head G, as shown in FIGURE 15. These upper limit steps 106 and 108 are studs which are adjustably threaded into indexing disk 110 and define the position to which the slider 38 will ascend after bonding. The bottom of the upper stop 108 is the positioning step for the bonding head B preparatory to bonding to dice or stripes, whereas the lower stop 106 represents the position of the bonding head slider 38 preparatory to bonding to a post. The disk 110 has a shaft 109 which is vertically journaled in a bearing 111. The indexing disk is rotated to either of the two step positions by a crank rod 112 which is eccentrically coupled thereto and actuated by rotation of cranking cam 114. The cranking cam 114 is driven by a programmer motor 116 which is energized only when the Z-arm 100 is depressed a sufficient distance to close microswitch 120. Closing of the microswitch 120 contacts occurs as a result of engagement by stud 118 projecting downwardly from the actuator plate 92. The surface of cam 114 engages the contactors of microswitches 122 and 124. These are located 180° apart from each other, and the flat of the cam is always oriented so that one or the other will be engaged. Microswitch 122 is normally open when the flat of the camming surface is in engagement therewith whereas microswitch 124 is closed when opposed by the flat. Thus, the circuit to the motor 116 will be broken on each half revolution of the cranking cam 114 and thereby cause either 0° or 180° actuation of the programmer motor 120, depending upon the programming set up.

Secured to the top of plunger 96 is a transverse bar 130 which has a permanent magnet 132 downwardly depending therefrom. The magnet 132 is adapted to be pulled down within a D.C. coil 134 when the coil is energized. The actuator plate 92 is maintained in a "down" or "bonding" position for a prescribed period of time set by either a low-position "dice" timer 138 or a high-position "post" timer 140, both of which are mounted in the console 16. See also FIGURE 23. An air dash-pot 142 is affixed to an inverted L-shaped bracket 144 which is mounted upon the housing 99, the piston 143 of the dash-pot being secured to the transverse member 130. However, when the Z-arm 100 is depressed and the actuator plate 92 held down by the action of the D.C. coil 134, opening of the D.C. circuit would ordinarily cause the actuator plate 92 to vertically recoil sharply since it is upwardly tensioned by spring 84 acting through cable 86. Since the bonding capillary H in slider 38 would similarly recoil, the dash-pot 142 provides the necessary retardation control in the upward return speed of the slider in order to prevent breakage of the extremely fine wire 80.

Also mounted on the bracket 144 is a microswitch 146 having an arm 147 adapted to be abutted by the transverse bar 130 when the actuator plate 92 is in the "up" position. That is, the contacts of microswitch 146 are open when the slider 38 is in the "down" position so that flame-off assembly D is inoperative at this time thereby preventing the flame from contacting the capillary H and precluding any likelihood of damage thereto.

The automatic flame-off assembly D is best shown in FIGURE 3 and FIGURES 11 to 13 inclusive and comprises a nozzle 150 which is connected through suitable "Tygon" tubing 152 to a source of hydrogen under pressure, the nozzle being adapted to follow an elliptical path whereby the flame at its tip is adapted to come in contact with the wire at determined portions of the machine cycle. The flame-off of the instant invention is a single pass system wherein the nozzle 150 travels in an elliptical path at a prescribed speed so as to sever the wire 80 and form uniform size balls during each pass. When the flame passes the wire 80 it simultaneously severs the wire and forms balls 82 on each of the opposed ends as a result of surface tension. The size of the balls formed is dependent upon the speed of the flame pass, the distance between the flame and the wire, and the gas pressuree. The size of the upper ball should be approximately twice the wire diameter since the ball 82 formed on the wire depending through the capillary H is engaged by the flare **76*b* when the slider 38 descends and forms the nail head bond on the dice or posts of the semiconductor device. The nozzle 150 is held by a thumb screw 155 within clamp 154 defined at the lower portion of a camming bracket 156. The interior portion of bracket 156 is provided with a ball bearing 158 which supports a cam 160 within its inner race way. Eccentrically secured to the cam 160 is a shaft 162 which is rotatably supported in flame-off head housing 164. A stationary pin 166 downwardly extends from the housing 164 and engages an elongated slot 168 in the camming bracket 156 so that rotation of the shaft 162 will cause the bracket 156, and consequently the nozzle 150 to describe an elliptical path. A flame-off motor 170 drives the shaft 162 by way of drive gear 172 and spur gear 173. The flame-off motor 170 is a D.C. permanent magnet motor which operates during each cycle for a single revolution. Upwardly extending from the drive gear 172 is a actuating pin 174 which engages arm 175 of microswitch 176 during each cycle of rotation of the motor 170. Thus, with each cycle of revolution of the motor 170, the pin 175 will open the contacts of microswitch 176 to de-energize relay R2 in the flame-off circuit (line 21 of FIGURE 20) and thereby causes the contacts R2–1 to open and to close the flame-off motor shunt contacts R2–2. The rear face of the flame-off head casing 164 has a key 178 which interfits within a complementary keyway in the head support bracket 30. The flame-off head D is secured to the head support bracket by a clamping screw 180 which is threaded into the key and longitudinally slides within slot 181 formed in the support bracket 30. The casing 164 is urged upwardly against thumb adjusting screw 182 by a spring 184 tensioned between hanger 185 mounted at the lower portions of casing 164 and hanger pin 186 extending from the support bracket 30. Thus, the vertical positioning of the nozzle 150 with respect to the wire 80 is adjusted by loosening clamping screw 180 and rotating thumb screw 182 in the desired direction so that the tip of the nozzle 150, i.e. the hydrogen flame, is below the capillary H end during cut-off. It is to be noted that the vertical position of the flame determines the wire lead length above the bond, and the flame height screw 182** is turned until the desired lead length is obtained. However, attention is invited to the fact that the minimum height for cut-off above a semi-conductor post is approximately .015 inch since the post is a heat sink which will attract and distort the flame if lowered below this point to result in unsevered wire.

Figure 2:
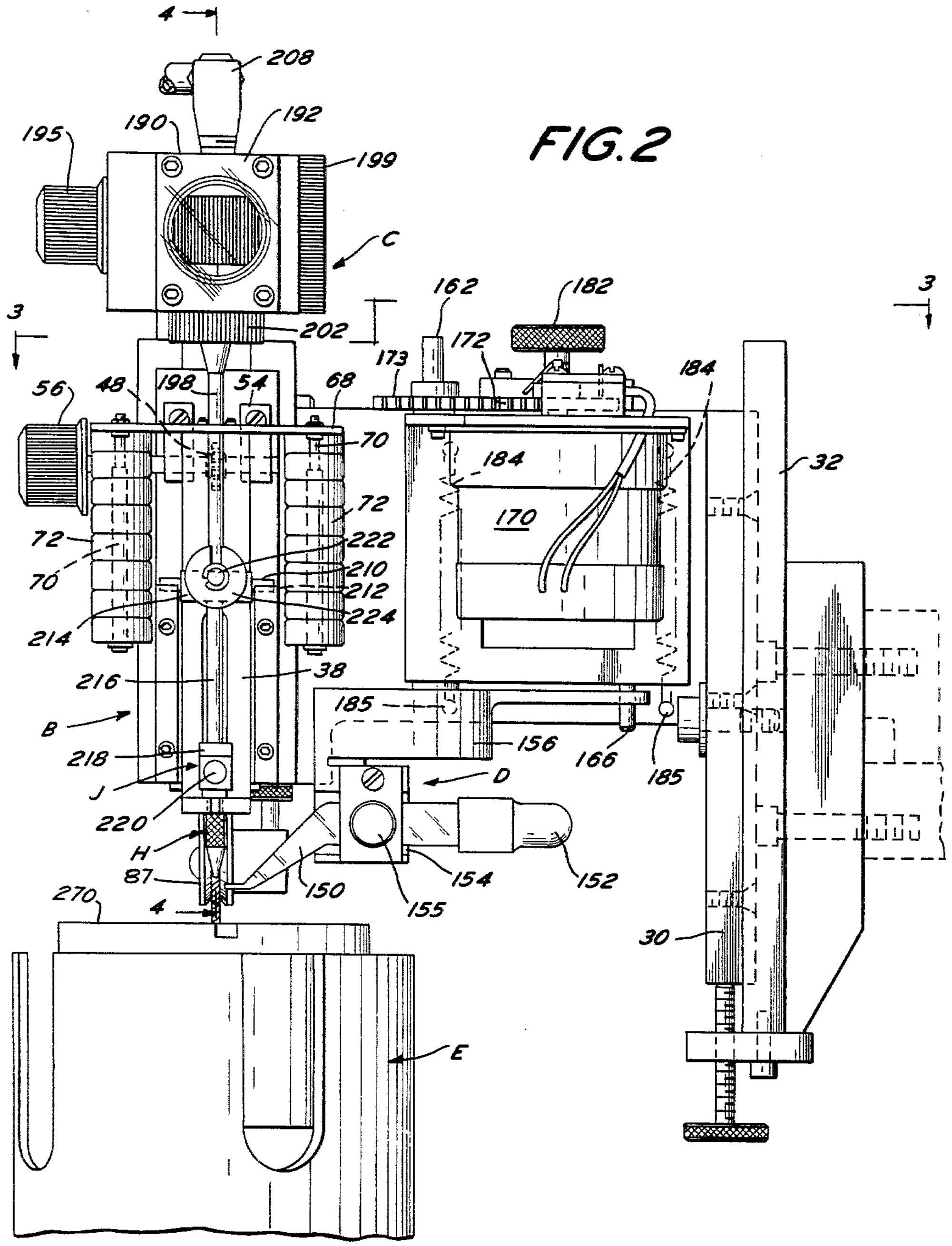
FIGURE 2 is an elevational view of the wire dispensing and bonding head assembly for semi-automatically performing nail head bonding operations.

The wire dispensing head C, which is best illustrated in FIGURES 2, 4, and 6, comprises a substantially rectangular housing 190 having a centrally disposed chamber 191 therein. The face of the chamber 190 has a transparent plate 192 secured thereto so that wire loading, threading and unspooling operations will be clearly visible to the operator. A "Teflon" mandrel 194 is rotatably supported in the housing 190 and is adapted to be turned in either direction by a knob 195. A spool 196 upon which the fine wire 80 is wound is mounted upon the mandrel 194 so that the wire may be dispensed through feed tube 198. Access to the interior of the housing 190 is obtained by removing cap plug 199 which is detachably threaded withing the housing. O-ring 200 in the plug forms a hermetic seal for the chamber 191. It is to be observed that the capping plug 199 has a knurled periphery to facilitate attachment and removal thereof. Where extremely fine gauge wire, in the range of 0.3 to 0.4 mil, is to be dispensed from the head C, a special low-mass spun-aluminum spool weighing approximately ½ gram is employed. The feed tube 198 has a knurled knob 202 which is threaded into a lower opening in the housing 190 and forms a seal therewith by O-ring 203. The interior of the plug portion 202 has a conically flared orifice 204 that defines an entrance funnel which facilitates the threading of the wire 80 into the bore of the feed tube 198. The lower end of the feed tube 198 has an annular reduced portion 206 which is adapted to freely interfit within the bore **76*a* of the capillary H or H1. A reducing gas such as nitrogen is introduced into the housing chamber 191 through fitting 208 in order to prevent contamination of the wire 80 after the spool 196 has been loaded upon the mandrel. The tail piece 43, which is secured to the rear of the dispenser housing 190 by screw 209, is inserted within the slot 42 so that the rack 45 is engaged by pinion 48. The vertical positioning of the wire dispensing head C is accomplished by appropriately turning the height adjustment know 56** on the bonding head B.

Referring now to FIGURES 2, 3, 4 and 5, we show a wire tensioning means J to prevent the wire 80 from curling up the feed tube 198 if there is no ball 82 or a small ball less than the diameter of the capillary bore 76 formed during flame-off. That is, since the wire 80 has been wound upon the spool 196 for convenient dispensing, the wire has inherent memory characteristics which gives it a tendency to return to the original curled or helical configuration. The wire tensioning means J is an inverted L-shaped device which is pivotally suspended by trunnions 210 detachably retained in V-notches 212 formed in the face of the bonding head block 34. The trunnions 210 are pressed into the ends of a cylindrical support 214. A rod 216 downwardly depends from the support 214 and has a bracket member 218 in which a ball bearing 220 with a flattened face is universely supported. A loading rod 222 projects from the support 214 substantially at right angles to the rod 216. Suitable weights 224 are hung upon the rod 222 so that the desired degree of force will be applied against the wire 80 sandwiched between the flat of the ball 220 and anvil 226. The anvil 226 slidably projects from the bonding head block 40 and is resiliently urged outwardly therefrom by a coil spring 228. Thus, the tip of anvil 226 will ordinarily project slightly beyond the vertical line of the wire 80 and the pivotal force exerted by the tensioning device ball 220 will keep the wire retained therebetween.

However, during loading of the wire 80 into the capillary H, the annularly reduced end 206 of feed tube 198 is inserted into the bore 76a. Therefore, in order to prevent interference of the feeding tube 206 with anvil 226, the bifurcated ends of the tail piece 43 are chamfered at 43a and act as camming surfaces which engage a pin 230 extending from the anvil 226. See FIGURE 4. Thus, when the dispensing head C is lowered to thread the wire 80 into the capillary H, the surfaces 43a cam the pin 230 so that the anvil 226 is withdrawn from the wire. It is also to be observed that the tensioning device J is not mounted during the wire loading and threading operations.

Loading of the bonding head B is accomplished as follows: With the dispensing head C removed from the bonding head, a spool 196, preferably spun aluminum, with a length of wire 80 wound thereupon is inserted upon the mandrel 194 through the opening in the side of the housing 190 provided by unscrewing the cap plug 199. The feed tube 198 has been removed by unscrewing the knurled knob 202. The end of the wire 80 is pulled through the bottom housing opening with a tweezers and a small ball is formed on this end by placing it in a flame of a match for example. With a vacuum applied to the end 206 of the feed tube, the wire 80 with the ball end 82 is placed into the conical funnel 204 and drawn through the feed tube 198. Both the cap plug 199 and the feed tube 198 are threaded into the respective apertures to make the chamber 191 air tight. The nitrogen gas is connected to the fitting 208, and the dispensing head C is mounted onto the bonding head B by inserting the tail piece 43 into the slot 42 provided therefor. After having snipped the wire approximately 1/16" from the end of the tube with a scissors, the nitrogen gas is turned off and the wire backed into the feed tube approximately 3/16" by turning knob 195. With the slider 38 mounted upon the actuating finger 60, the end 206 of the feed tube is lowered into the opening 76a of the capillary H by rotating the knob 56. Nitrogen gas is fed into the fitting 208 so that the housing chamber 191 is pressurized. The knob 195 is now rotated to feed the wire on a stream of nitrogen gas through the capillary H until the wire end projects therethrough. This can be facilitated by gently tapping or vibrating the feed tube. Manual flame-off button 240 is pressed with the single-pole double throw switch 238 in the manual position to form a ball 82 on the end of the wire. The button 240 may either be mounted upon the chessman 26 or be a foot operated switch. The manual-automatic switch 238 is mounted upon the console 16. Knob 195 is now rotated in the opposite direction to raise the wire feed tube until the tensioner J comes in contact with the wire 80. The bonding head is now loaded and ready for operation.

Transistor headers X may now be loaded into the multi-stage heat column E which comprises a rotatable platform 270 having a plurality of circumferentially spaced openings adapted to hold the header flanges. The headers will project above the platform so that the terminal posts 262 and the wafer 22 having strips 264 will be exposed for incorporating the lead wire 80 between the stripes respective terminal posts as shown in FIGURE 17.

Figure 20:
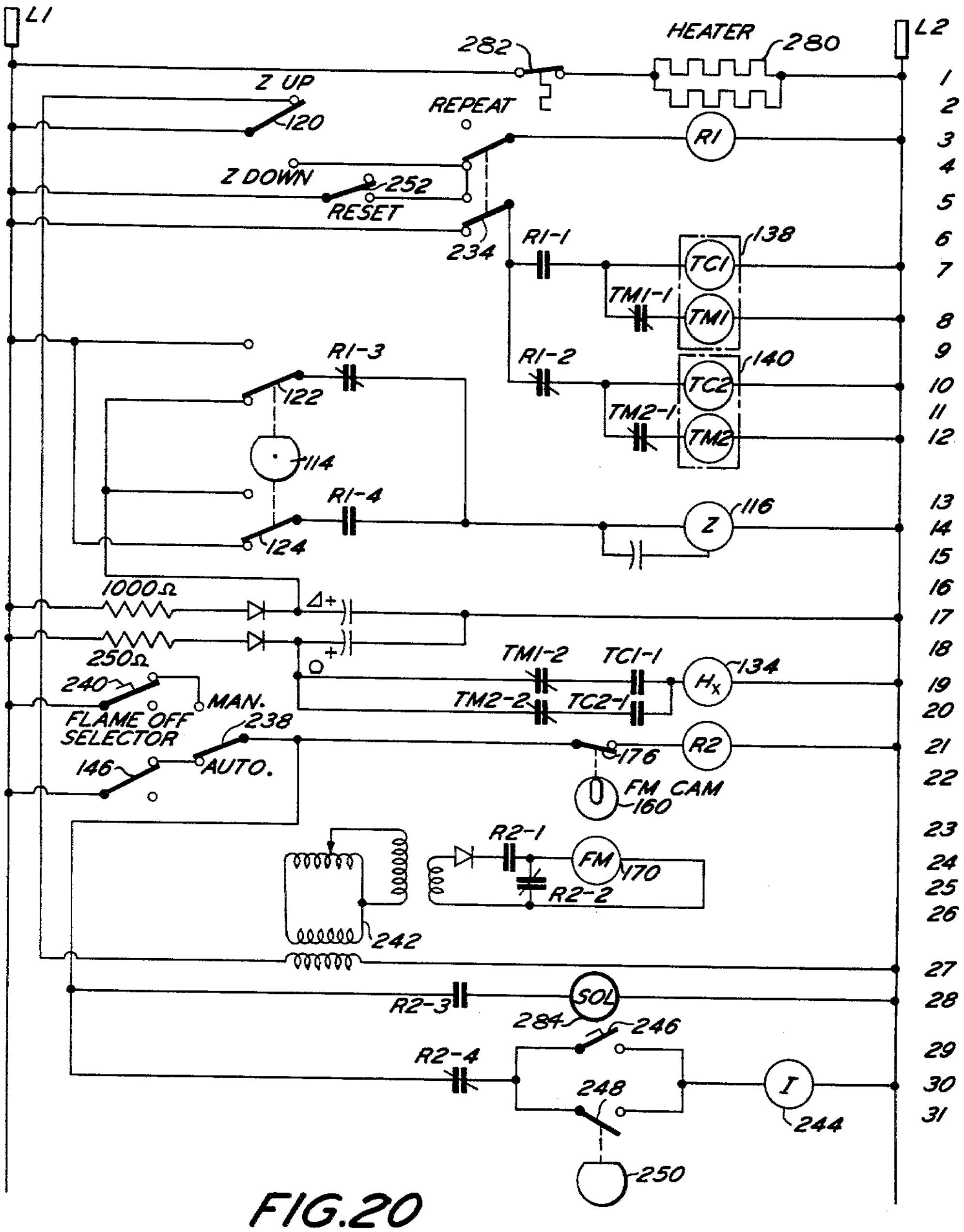
FIGURE 20 is a schematic wiring diagram of the programming circuit embodied in this invention.

Referring now to the method of operation of the instant invention, and particularly to the circuit diagram of FIGURE 20, switch 234 and flame-off selector switch 238, both of which are located on the console module 16, are thrown into the lower position as indicated. All relays and electrical circuit components are shown in the across-the-line diagram of FIGURE 20 even though they may be remotely located. In order to correlate the location of the actuating coils and contacts, a marginal key has been employed. The diagram has been accordingly divided into horizontal bands which are identified with the line numbers in the right hand margin adjacent the vertical line L2, L1–L2 representing a 120 volt, 60 cycle, A.C. supply. Relay and holding coils are identified by encircled letters in the particular horizontal line.

The timer 138 (dice) and 140 (post) are set for the desired bonding periods which can be obtained experimentally. Reset button 252 is depressed so that the programmer G will be oriented to sequentially perform (1) nail head bond to stripe (2) wedge bond to terminal post and (3) automatic flame-off to sever the wire. The cam 114 if not correctly oriented will be thrown by the actuation of the Z program motor 116 to a position whereby the higher step 108 in the indexing disk 110 is presented to the bar 130. After the capillary H is manipulated by the micropositioner F (chessman 26) to a position directly over the dice stripe 264, the Z arm 100 is fully depressed to the bottom of its stroke. Relay R1 (line 3) will be energized thereby closing contacts R1–1 (line 6) and R1–4 (line 14) and simultaneously opening contacts R1–2 (line 10) and R1–3, since microswitch contactor 120 has been urged downwardly to its "Z-down" position of line 4. Timer motor coil TM1 and timer clutch coil TC1 will both be energized so that the timer pointer will run against an internal spring for the designated period at the end of which time contacts TM1–1 (line 8) and TM1–2 (line 18) will open. Since the contacts TC1–1 and TM1–2 (line 18) are both closed, the D.C. coil 134 (designated $H_x$ in the across-the-line diagram) is energized so that the slide actuator 130, and consequently finger 60, will be held down until the timer motor TM1 completes its cycle and opens contactor TM1–2. The bonding slider 38 will be free of the finger 60 so that the tip of the capillary H will be resting upon the ball 82 depending therefrom the wire 80 to thermocompressively press the ball against the stripe 264. Note that heater coils 280 (line 1) and thermostat 282 contained in the heat platform E have maintained the transistor header X at a temperature of 340° C.

The Z programming motor 116 will have been energized (contacts R1–4) being closed) thereby causing cam 114 to rotate one-half revolution so as to present the lower step 106 on the indexing disk 110 to the actuator bar 130. Note that the flat of cam 114 in FIGURE 20 will now be facing downwardly, and since R1–3 contacts are open they will thereupon de-energize Z motor 116 after one-half revolution thereof. It is also to be noted that the slider 38 will have fallen with substantially zero friction so that the bonding pressure would be identical on successive bonds.

When the TM1 timer motor completes its run, TM1–2 contacts will open and de-energize $H_x$ hold-down coil 134. The springs 84 will draw the actuating finger 60, and hence the slider 38, upwardly until the actuator bar 130 abuts the bottom of the lower step 106. Z-arm 100 will also be released so as to open contactor 120 and de-energize relay R1. Attention is invited to the fact that there is approximately 1/8" clearance between the slider notch 58 and the slider roller 66 when the capillary tip H abuts the wafer 22. In order to avoid breaking the wire 80 as the slider 38 is engaged by the elevating finger 60, the piston 143 in dash pot 142 decelerates the upward motion of bar 130 at this stage and enables the slider 38 to rise with a controlled motion.

After slider 38 has been elevated to the bottom of the lower step 106, the capillary H will have been set to draw enough wire 80 out to perform post bonding. The capillary is then manipulated over to the adjacent post 262 (movement of chessman 26) and the Z-arm 100 once more depressed to the bottom of its stroke. It is to be noted that the relay R1 is a sequence relay which upon successive actuation alternately operates to reverse the position of its contacts. Thus, sequence relay R1 first has acted to energize only the dice timer 138 by closing contacts R1–1 and opening contacts R1–2. When the Z-arm 100 has been depressed the second time, sequence relay R1 will now open contacts R1–1 and close contacts R2–2 so that only the post timer 140 is operative. Flame-off will not occur as long as bar 130 is below the position which will close microswitch 146. Since there will have been no ball formed on the upper end of the wire immediately prior to post bonding, only an edge of the capillary tip will bear against the wire 80, one end of which is ball-bonded to the stripe 264. Therefore a "wedge" bond is effectively performed at the post 262. The bonding time will be dependent upon the designated setting of the timer 140 cycle. During this period, the D.C. hold down coil 134 ($H_x$) has been energized by the closing of TC2–1 contacts in line 20. Similarly the Z-programmer motor 116 will have been energized through the now closed contacts R1–3, thereby returning the cam 114 into its original posiiton shown in FIGURE 20 diagram. The upper step 108 indexing disk 110 will now be presented to the actuator bar 130. In this upper step position, the actuator bar will bear against the spring arm 147 so as to close microswitch contactor 146 and energize relay R2 in line 21. Note at this stage, since the timer 140 has completed its cycle the Z-arm 100 and microswitch 120 will have returned to its "up" position, and variable transformer 242 (line 24) will be energized. Because contacts R2–1 (line 23) are now closed, and shunt contacts R2–2 accordingly open, the flame-off motor 170 will be actuated. The nozzle 150 will travel through an elliptical path across the wire 80 immediately below the tip of capillary H whereby the flame will sever the upstanding wire and form balls 82 on the opposing spaced wire ends. Attention is invited to the fact that a solenoid 284 (line 28) is energized by the actuation of relay R2 which closes contacts R2–3. That is, the solenoid 284 is linked to a valve (not shown) which controls the flow of nitrogen immediately around the semi-conductor device X in the heat platform E. While it is desirable to bathe the transistors with a reducing gas during the actual nail or wedge bonding operation to prevent oxidation, it is also necessary to cut off the flow of nitrogen during flame-off so that the flame at the nozzle tip 150 will not be extinguished.

When pin 174 on gear 172 abuts microswitch arm 175, the microswitch contacts 176 will open and immediately de-energize relay R2. Power to the flame-off motor 170 will be shut off since R2–1 contacts are now open. In addition, the closing of shunt contacts R2–2 will effectively brake the D.C. flame-off motor 170 to a stop. The same sequence of operations is repeated on the second stripe 264 and its adjacent post on semi-conductor device X. It is to be noted that the programming motor 116 has stepped the indexing disk 110 to the upper stop 108. Furthermore, the next depression of the Z-arm 100 will actuate the sequence relay R1 so that timer 138 will be set for the "dice" or "wafer" bonding operation.

When the leads have been completed on the semi-conductor device X, indexing motor switch 246 (line 29) is momentarily depressed by a foot treadle (not shown) so that indexing motor 244, designated I in FIGURE 20 diagram, will rotate the turntable 270. The indexing motor 244 is utilized to turn an indexing system crank 250 which is designated schematically in FIGURE 20. A bearing (not shown) links the crank to the bottom of the heat column E. One revolution of the crank 250 indexes the turntable 270 through 90°, for example, and presents the next semi-conductor device X into lead bonding position. It is thus apparent that the foregoing invention permits the application of dice-to-post bond leads with great facility.

Referring now to FIGURE 18, "pig-tail" leads can also be applied with the above apparatus to a semi-conductor device in the manner illustrated by transistor X1, as follows: The switch 234 is thrown to its upper "repeat" position and the flame-off selector to automatic position. The reset button 252 is depressed, if necessary, to actuate timer 140 through sequence relay R1. Thus, each time the Z-arm 100 is depressed and then released, a "nail head" bond will be made since the flame-off motor 170 will automatically run through its cycle to sever the upstanding wire with each bond.

In order to perform stitch bonding operations, as shown by the transistor X2, in FIGURE 19, the flame-off selector 238 is thrown into "manual" position so that the flame-off motor 170 will only be activated by the depressing of flame-off switch button 240. Thus a series of wedge bonds to successive stripes 264 can be made after an initial "ball' bond has been made upon circular stripe 266, for example. The final severing of the upstanding end can be obtained by depressing button 240.

It is most significant to note that the capillaries utilized with the instant invention, either the carbide tip H or the glass tip H1, are relatively short as compared to those previously employed in ball bonding devices. The actual length of the capillaries H or H1 is no more than ⅝ inch which is important to reduce the frictional effects of the bore therein as it slidably engages the wire 80 passing therethrough. As has been mentioned previously, the memory characteristics of wire once having been wound about a spool generally induces the unreeled wire to reassume its initial condition, and as a consequence, to endeavor to re-coil within the capillary. Because of the fragility of extremely fine wire (in the range below .0007 inch), it has been heretofore impossible to utilize such leads with ball bonding operations since the frictional effects of the semi-coils in the capillary bore became appreciable. Thus, while the tensioning device J accommodates for the proclivity of the re-coiling effect within the feed tube 198, the extremely short capillary reduces frictioning within the bonding tool. Therefore, the axial spacing between the tensioning device J and the flame nozzle 150 is a minimum dimension to lend great efficiency with even .0005 inch lead wire 80.

It is also important to observe that the low-mass spun-aluminum spool 196 freely rotates on the pintle or mandrel 194 as the lowering of the bonding tool H draws the wire therefrom. Thus, during loading of the capillaries, the wire dispenser C is lowered so that the end of feed tube 198 is injected into the capillary bore. In the loading operation, the knob 195 is rotated to advance the wire 80 through the feed tube and the capillary. However, the friction and mass of the spool on the pintle is less than the rotational friction and mass of the pintle 194 and the knob 195 in the housing 190. As a consequence, the spool 196 will overrun on the pintle 194 during bonding and therefore minimize the friction and inertia which might otherwise cause failure of the extremely fine wire. Another means of accomplishing the overrunning action is by a mechanical clutch actuated pintle, although the embodiment illustrated by the free-running low-inertial spool 196 is essentially a clutch.

Although this invention has been described in considerable detail, such description is intended as being illustrative rather than limiting, since the invention may be variously embodied, and the scope of the invention is to be determined as claimed.

What is claimed is:

1. Apparatus for thermocompressively bonding lead wire to semi-conductor devices comprising a vertically-disposed guideway, an actuating finger vertically reciprocable in said guideway, means resiliently biasing said actuating finger in an upward direction, an elongated slider detachably suspended from said finger, means on said finger cooperating with the weight of said slider horizontally inducing said slider into complementary face-to-face slidable contact with said guideway, a wire-carrying bonding tool on said slider, said slider having a center of gravity eccentrically disposed with respect to said tool, and means to depress said finger to a level at which said tool abuts the semi-conductor device and the slider becomes detached from said finger, whereby the moment of said detached slider acting through the point of abutment of said tool with the semi-conductor device maintains said slider in face-to-face contact with said guideway so that said tool will be guided in a pure vertical frictionless path and will repeatedly exert the same force on successive bonds without scrubbing.

2. The invention of claim 1 including hold-down means to lock said finger in a depressed position, and timer means actuated by the depression of said finger below the level at which said slider becomes detached automatically triggering and then retaining said hold-down means in finger locking position for a predetermined period of time and thereafter actuating the release thereof, whereby said biasing means will elevate said finger with the slider re-engaged thereupon.

3. The invention of claim 2 including damping means to retard the initial elevation of said finger so as to enable said slider to rise with a slow controlled motion without breaking said wire.

4. The invention of claim 3 wherein said damping means comprises a dash pot.

5. Apparatus for thermocompressively bonding lead wire to semi-conductor devices comprising a vertically-disposed guideway, an actuating finger reciprocable in said guideway and having an inclined surface thereon, a slider detachably suspended from said finger and urged horizontally by the inclined surface into face-to-face contact with said guideway, a wire-carrying capillary mounted on said slider forwardly of the center of gravity thereof, and means depressing said finger to a level at which said capillary engages the semiconductor device so that the slider upon abutment of said capillary with the semi-conductor device will be released from said finger along a true vertical frictionless line and exert a constant uniform bonding pressure without scrubbing.

6. The invention of claim 5 including means actuated by the depression of said finger to the level at which said capillary engages the work locking said finger in such depressed position for a predetermined period of time, and means thereafter to elevate said finger automatically with a slow controlled motion with said slider re-engaged thereon.

7. A thermocompression wire bonding apparatus for securing leads to semi-conductor devices comprising a frame, a wire bonding head in said frame and being adapted to be manipulated in a horizontal plane, a vertically reciprocable capillary depending from said bonding head, dispensing means in said head delivering wire from a spool to said capillary, means to depress said capillary to a level at which wire depending therefrom will be urged into engagement with a first location on the semi-conductor device, means to hold down said capillary for a predetermined time at the first location whereat a nail head bond is formed, means to elevate said capillary automatically about the wire upstanding from said nail head bond to a first level which will include therebelow a measured length of wire sufficient to extend to a second location on the semi-conductor device, means to depress said capillary against the wire depending therefrom into contact with the device at the second location, means to hold down said capillary for a predetermined time at the second location whereat a wedge bond is formed, means to elevate said capillary automatically to a second level above said first level, a flame carrying torch in said frame movable in a horizontal plane about an elliptical path and adapted to intercept the wire depending below the capillary at the second level, and means to automatically actuate the movement of said torch only when said capillary has ascended to said second level whereby said torch will be caused to make a single pass across the wire upstanding from said wedge bond so as to sever the wire and form balls on the opposed severed ends thereof.

8. The invention of claim 7 including tensioning means on said head intermediate said dispensing means and the upper portion of said capillary, said dispensing means frictionally embracing the wire and precluding its re-assuming a helical configuration developed from being wound on the spool.

9. A thermocompression wire bonding apparatus for securing leads to semi-conductor devices comprising a vertically reciprocable bonding tool, dispensing means delivering wire to said tool, means depressing said tool into engagement with the work so as to bond the wire at a first location thereon, means to elevate said tool to a predetermined first level from which will depend therebelow a measured length of wire upstanding from said bond sufficient to extend from said first location to a second predetermined location on the work, means to elevate said tool to a predetermined second level, programming means for selectively controlling said first and second levels, a flame carrying torch in said frame movable in a horizontal plane and adapted to intercept the wire depending from said tool, and means automatically actuating the movement of said torch when said capillary has ascended to said second level and cause said torch to make a single pass across the wire so as to sever the wire.

10. The invention of claim 9 wherein said programming means comprises an indexing cam.

11. A thermocompression wire bonding apparatus for securing leads to semi-conductor devices comprising a vertically reciprocable bonding capillary, dispensing means delivering wire to said capillary, means for depressing said tool upon the semi-conductor device, means to hold down said tool automatically after the work has been engaged thereby, first timer means actuating said hold down means for a predetermined period upon a "dice" position on the semi-conductor device, second timer means actuating said hold down means for a predetermined period upon a "post" position on the semi-conductor device, a sequencing relay automatically and selectively actuating said first timer means and said second timer means, and means constituting a switch actuating said sequencing relay when said capillary is depressed whereby uniformly consistent nail head bonds and wedge bonds will be formed at the respective "dice" and "post" positions.

12. The invention of claim 11 including means constituting a torch movable in a horizontal plane and adapted to intercept the wire depending from said capillary, and switch means automatically actuating the movement of said torch and causing the same to make a single pass across the wire after a bond at the "post" position has been completed.

13. In a nail head bonding apparatus having lead wire dispensed from a spool through a vertically reciprocable capillary, a wire tensioner comprising anvil means interposed in the path of the wire, and means sandwiching said wire against said anvil means whereby the wire will be frictionally tensioned therebetween and precluded from reassuming a helical configuration.

14. The invention of claim 13 wherein said second means comprises a pivotally supported member, and means constituting a ball and socket joint universally mounted in said member, the ball having a flat surface thereon which becomes self-aligned with said anvil means so as to assume optimum contact with the wire.

15. The invention of claim 13 wherein weights are detachably suspended upon said member so that an adjustable frictional load may be imposed against said wire.

16. Apparatus for thermocompressively bonding lead wire to semi-conductor devices comprising a vertical-disposed guideway, a capillary vertically reciprocable in said guideway, dispensing means on said guideway delivering wire from a spool to said capillary, tensioning means intermediate said dispensing means and said capillary frictionally sandwiching the wire and preventing the wire from reassuming a helical configuration which results from having been wound upon the spool, and flame cut-off means disposed below said capillary for severing the wire and forming a ball on the wire end projecting from said capillary.

17. The invention of claim 16 wherein said capillary is relatively short in length in order to minimize re-coiling of the wire in the capillary bore and diminish frictional effects thereof during bonding.

18. In a thermocompression bonding apparatus for securing lead wire by a vertically-reciprocable tool, dispensing means for loading and delivering wire to said tool comprising a housing, a pintle rotatably supported in said housing, a wire-carrying spool slidably supported rotatably on said pintle, a knob on said pintle exterior of said housing, and a feed tube projecting downwardly from and communicating with the interior of said housing, the rotational friction of said pintle in said housing being greater than the rotational friction of said spool on said pintle whereby the wire may be loaded in said tool by rotating said knob so that said pintle will rotate in said housing, and means to depress said tool into engagement with the work whereby the depression of the tool will draw the wire from the spool by rotation thereof on said pintle so that said spool will overrun on said pintle in order to minimize frictional effects on wire having a diameter less than .0007 inch.

19. In a nail head bonding apparatus having a vertically-reciprocable capillary for securing lead wire to semiconductor devices, dispensing means for loading and delivering wire from a spool to the capillary comprising a frame, a housing rotatably supporting the wire-carrying spool therein, a feed tube projecting downwardly from said housing and communicating with the interior thereof, means for vertically reciprocating said housing on said frame so that said feed tube is axially interjectable into and out of the bore of said capillary, means to turn the spool by hand when said feed tube is inserted within said capillary in order to effect loading thereof, and means to depresss said capillary with wire depending therefrom into contact with the work so that the wire will be dispensed from the spool with said feed tube acting as a guide.

20. In a thermocompression bonding apparatus having a reciprocable capillary for securing lead wire to semiconductor devices, dispensing means for loading and delivering wire from a spool to the capillary comprising a housing, rotatable means supporting the spool within said housing, manual turning means exterior to said housing for actuating said rotatable means, a feed tube projecting downwardly from and communicating with the interior of said housing, means to depress said housing so that said feed tube is interjected into said capillary so that the wire may be loaded in said capillary by actuation of said turning means, overrunning means slidably coupling the spool to said rotatable means, and means to elevate said housing so that said feed tube will be withdrawn from said capillary and remain in axial alignment therewith, and means to depress said capillary with the wire loaded therein into engagement with the work whereby depression of the capillary will draw the wire from said spool without causing rotation of said rotatable means so that wire having a diameter of less than .0007 inch may easily be dispensed with minimal frictional drag.

21. A nail head bonding apparatus for thermocompressively securing leads to semi-conductor devices comprising a vertically reciprocable capillary, dispensing means for delivering the wire from a spool to said capillary, torch means for forming a ball on the end of the wire projecting from said capillary, means for depressing said capillary with the ball-ended wire depending therefrom into contact with a first position on the semi-conductor device to make a nail head bond therewith, resilient means to bias said capillary constantly in an upward direction, and adjustable stop means to limit the upwardly biased ascent of said capillary to a given elevation which will cause said resilient means to raise said capillary a predetermined distance on the wire upwardly extending from the first bond whereby a wedge bond on a second position on the semi-conductor device lead-coupled with the first position may be formed with a pre-measured minimal length of wire so as to avoid either too tight or too slight a catenary on the wire depending from the spool.

22. A nail head bonding apparatus for thermocompressively securing lead wire to semi-conductor devices comprising a frame, a vertically reciprocable capillary in said frame, a heating platform in said frame for supporting and elevating the temperature of the semi-conductor devices preparatory to lead bonding thereof, means for enveloping the semi-conductor devices with an inert gas during bonding, flame-off means adapted to be actuated by selective elevation of said capillary automatically severing the wire and forming balls on the opposed severed ends thereof, valve means adapted to cut off the supply of inert gas during actuation of said flame-off means, and control means for initiating a flame-off cycle of actuation and automatically actuating said valve means to cut off the inert gas during severing the wire in order to preclude any fluctuations in said flame-off means during ball forming whereby consistency in ball size and bond will be provided.

23. In a nail head bonding apparatus, dispensing means for loading and delivering fine wire from a spool to a capillary comprising a support block, a guideway head secured to said support block and slidably supporting said capillary so that the capillary bore is reciprocable along a vertical axis, said support block including a vertically disposed channel therein, a housing rotatably supporting the wire carrying spool within a chamber therein and having a downwardly depending tongue which is slidably received within the channel, a feed tube having a flared orifice communicating with the housing chamber and a lower end adapted to be received within the capillary bore, said head having a manually rotatable pinion in engagement with a rack on said tongue whereby said housing may be depressed so that the end of the feed tube is interjected within the capillary bore, a knob on said housing for turning said spool in order to pay wire off from said spool and through the feed tube injected within said capillary, and means for introducing an inert gas under pressure into said housing so that the wire threaded through said feed tube will be frictionlessly guided through said capillary on a pneumatic stream whereby extremely fine wire may be threaded through said capillary bore and effect loading thereof in preparation for ball bonding.

References Cited by the Examiner

UNITED STATES PATENTS

| | | | |
|---|---|---|---|
| 3,050,617 | 8/1962 | Lasch | 219—85 |
| 3,083,595 | 4/1963 | Frank | 78—82 |
| 3,101,635 | 8/1963 | Kulicke | 29—470.1 |
| 3,125,906 | 3/1964 | Johnson | 78—82 |
| 3,149,510 | 9/1964 | Kulicke | 228—3 |

CHARLES W. LANHAM, *Primary Examiner.*

WILLIAM J. STEPHENSON, *Examiner.*

G. P. CROSBY, *Assistant Examiner.*